United States Patent [19]

James et al.

[11] Patent Number: 5,204,042

[45] Date of Patent: Apr. 20, 1993

[54] METHOD OF MAKING COMPOSITE LAMINATE PARTS COMBINING RESIN TRANSFER MOLDING AND A TRAPPED EXPANSION MEMBER

[75] Inventors: Darryl G. James, Camarillo; Aubrey G. Jackson, Jr., Huntington Beach, both of Calif.; Stephen M. Novak, Maple Valley, Wash.

[73] Assignee: Northrop Corporation, Los Angeles, Calif.

[21] Appl. No.: 562,547

[22] Filed: Aug. 3, 1990

[51] Int. Cl.⁵ .............................................. B28B 7/30
[52] U.S. Cl. .................... 264/257; 264/313; 264/328.2; 425/129.1; 425/417; 425/543; 425/561; 425/DIG. 14; 425/DIG. 44
[58] Field of Search .............. 264/257, 258, 102, 313, 264/314, 510, 511, 512, 328.7, 328.2; 425/129.1, 417, DIG. 14, DIG. 44, 110, 125, 127, 543, 544, 547, 557, 561, 116

[56] References Cited

U.S. PATENT DOCUMENTS

| | | | |
|---|---|---|---|
| 3,165,569 | 1/1965 | Bright | 264/313 |
| 3,264,392 | 8/1966 | Taplin | 425/DIG. 44 |
| 3,704,970 | 12/1972 | Reeves | 425/417 |
| 4,123,494 | 10/1978 | Evrard et al. | 264/334 |
| 4,167,430 | 9/1979 | Arachi | 264/313 |
| 4,271,116 | 6/1981 | Jones | 264/257 |
| 4,473,208 | 9/1984 | Nava | 264/314 |
| 4,492,607 | 1/1985 | Halcomb | 156/249 |
| 4,624,820 | 11/1986 | Barraclough | 264/313 |
| 4,683,099 | 7/1987 | Buxton et al. | 264/257 |
| 4,702,870 | 10/1987 | Setterholm et al. | 264/313 |
| 4,704,240 | 11/1987 | Reavely | 264/313 |
| 4,762,740 | 8/1988 | Johnson | 264/266 |
| 4,808,362 | 2/1989 | Freeman | 425/417 |
| 4,880,583 | 11/1989 | Douglas | 264/313 |
| 4,889,668 | 12/1989 | Kemp | 264/257 |
| 4,911,876 | 3/1990 | Freeman | 264/314 |
| 4,952,135 | 8/1990 | Douglas | 264/257 |
| 4,986,948 | 1/1991 | Komiya et al. | 264/294 |
| 5,041,260 | 8/1991 | Johnson et al. | 264/510 |
| 5,061,418 | 10/1991 | Ware | 264/257 |
| 5,087,193 | 2/1992 | Herbert, Jr. | 425/543 |

*Primary Examiner*—Jay H. Woo
*Assistant Examiner*—Robert B. Davis
*Attorney, Agent, or Firm*—Terry J. Anderson; Robert B. Block; Karl J. Hoch, Jr.

[57] ABSTRACT

In a process for forming composite laminate parts from reinforcing fibers and resin, a mold is selected which has a mold cavity having a part definition surface therein and a resin passageway leading to the cavity. An expansion member capable of expanding to a larger volume in response to heat is located in the cavity in conjunction reinforcing fibers which will form a part of the composite laminate part. The mold cavity is closed and resin is injected through the resin passageway to saturate the fibers. The expansion member is heated to expand the expansion member an amount sufficient to consolidate the resin and the reinforcing fibers between the expansion member and the part definition surface to shape the fibers and the resin into a component laminate part mimicking the shape of the part definition surface and to expel any excess resin from the cavity to the passageway. The resin is then cured within the mold for a time sufficient for the consolidated fibers and resin to maintain the shape of the part definition surface.

18 Claims, 3 Drawing Sheets

METHOD OF MAKING COMPOSITE LAMINATE PARTS COMBINING RESIN TRANSFER MOLDING AND A TRAPPED EXPANSION MEMBER

BACKGROUND OF THE INVENTION

This invention is directed to a process and system for forming composite laminate parts utilizing resin transfer molding in combination with a trapped expansion member.

Various molding systems are known for forming composite laminate parts. In each of these a resin having reinforcing fibers located therein is cured to solidify the resin. One of the most widely utilized composite laminate systems is common glass fiber reinforced plastic is prepared by incorporating finely chopped glass fibers or a glass fiber fabric or mat within a body of resin. The resin typically is cured via a catalysis at room temperature and ambient pressure. Fiber loading is normally low and thus strength is limited.

For high performance applications, as for instance aerospace applications, more exotic composite systems and formation methods are utilized. Prepregs of resin impregnated filaments are available from various manufacturers. These prepregs are shaped and cured utilizing a mold. Prior to curing, the prepreg is shaped to the contour of the mold by the application of pressure.

One pressure technique utilized to shape the prepreg to the mold is vacuum forming. In this technique, a prepreg is laid over a mold surface and covered with a vacuum bagging material. Vacuum is then created between the mold and the vacuum bagging material to shape and hold the prepreg to the mold. The vacuum must be maintained during curing of the prepreg resin to maintain it in the shape of the mold. While this system is very utilitarian it has certain disadvantages. One such disadvantage results from having to maintain the vacuum between the vacuum bag and the mold during the curing cycle. Since the curing cycle is typically done in an autoclave, this requires complicated fixtures and the like within the interior of the autoclave for propagating vacuum to the vacuum bag. Further in many instances a bleed cloth is necessary between the prepreg and the vacuum bag to soak up excess resin that bleeds off of the prepreg during consolidation. Typical of this method of fabrication is that described in U.S. Pat. No. 4,683,099, to Buxton, et al.

In order to eliminate the necessity of vacuum bagging, fixed volume trapped rubber molding apparatuses are utilized. In this system a multiple component mold is used. A cavity is located in the mold in the shape of the item to be molded. A bleed cloth is located in the mold followed by a layer or layers of prepreg as necessary for the composite part. A rubber member having a complementary surface to the part to be molded is then inserted in the mold and the mold closed. The mold is heated to cure the resin and simultaneously to expand the rubber member. Expansion of the rubber member consolidates the prepreg and squeezes excess resin into the bleed cloth. Typical of such a system is the system described in U.S. Pat. No. 4,271,116 to Jones.

In a modification of the above system typified by Jones, a foam or other light weight core is incorporated into the composite part by loading it in the mold with the prepreg. Such a structure is shown in U.S. Pat. No. 4,167,430 to Arachi. Further, the basic system typified by Jones can be augmented by modifying the molds to include one part of the mold being movable such that it can be hydraulically pressed against the remainder of the mold. This is done to increase the pressure transmitted to the prepreg located in the interior of the mold. Typical of this is U.S. Pat. No. 4,624,820 to Barraclough.

In a further adaptation of the above systems typified by Jones, duel rubber expansion members are used. A first expansion member defines a surface of the part being formed. The second expansion member is independently heated or cooled for pressurizing the first and the prepreg trapped between the first and a molding surface. Such a system is described in U.S. Pat. No. 4,812,115 to Kemp.

Irrespective of the mold system used, the use of a prepreg has an inherent disadvantage—a prepreg has very limited shelf life. To enable it to polymerize, the resin component of the prepreg must include all its necessary polymeric precursors; however, these precursors must be inhibited from prematurely curing prior to shaping and consolidation. This normally requires refrigerated shipping and storage to extend its shelf life. Further in using a prepreg, as is exemplified in the above referenced Barraclough and Kemp patents, consideration must be given to coordination of the heating and expansion of the rubber member in order to maintain the proper pressure profiles and volumes during consolidation of the prepreg to the composite part. Additionally, since there is little or no gap left between the consolidating rubber member and the prepreg after it is located in the mold, it is sometimes very difficult to close the mold about the prepreg. Difficulty in closing the mold can result in increase labor expense associated with using prepregs.

An older molding technique that was used prior to the introduction of prepreg is referred to as resin transfer molding. It has certain advantages compared to hand lay-up and autoclave curing and other labor and capital intensive processes for high performance environments, such as the above described use of prepreg. While resin transfer molding has certain advantage, it also has a disadvantage. In present resin transfer molding techniques fiber loading is low. Present resin transfer molding techniques have only been able to achieve maximum fiber loading of 50 or 60% by weight.

In resin transfer molding a two sided mold having a controlled gap between the sides of the molds is loaded with a dry fiber preform. These fiber preforms differ from prepregs since they do not contain resin or resin precursors. The various parts of the mold are secured together and resin is injected into the fiber preform within the mold to saturate the fiber preform and shape the resin and fibers to the surfaces on both sides of the part.

While resin transfer molding does not require the use of prepregs it does require the use of expensive two sided molds. Because a two sided mold must be used, with very few exceptions, the molds must be constructed from metals. Depending upon part complexity, the machining and fabrication of these metal molds can be very expensive. In common with the above described prepreg molding techniques, loading of these molds with preform fibers can be time consuming because the volume of the preform fiber, like the volume of the prepreg, approaches that of the finished component part. This complicates the loading. A recent review of current resin transfer molding techniques is:

Resin Transfer Molding For Advanced Composites, Debbie Stover, *Advanced Composites*, March/April 1990, page 60.

BRIEF DESCRIPTION OF THE INVENTION

It is a broad object of this invention to provide for an improved molding process for composite laminate parts. It is a further object of this invention to provide for a mold system and an improved molding process for making composite laminate parts that combines resin transfer molding and a trapped expanding member.

These and other objects as will become evident from the remainder of this specification are achieved in a process for forming a composite part from reinforcing fibers and resin comprising selecting a mold having a mold cavity, a resin passageway to the cavity, and a part definition surface for defining the shape of a composite part to be formed. Selecting an expansion member capable of expanding to a larger volume in response to being heated. Locating the expansion member in the mold cavity. Locating reinforcing fibers in the mold cavity in association with the expansion member and closing the mold cavity. Injecting resin into the closed mold cavity through the resin passageway to saturate the fibers. Heating the expansion member to expand the expansion member an amount sufficient to consolidate the resin and the reinforcing fibers between the expansion member and the part definition surface to shape the fibers and resin into a component part mimicking the shape of the part definition surface and to expel any excess resin from the cavity through the passageway. Then curing the resin within the mold for a time sufficient for the consolidated fibers and resin to maintain the shape of the part definition surface.

For the above process it is preferred to use an elastomeric member as the expansion member. The elastomeric member would be chosen such that it has a sufficiently positive coefficient of thermal expansion whereby upon heating it substantially expands from an unexpanded initial state having a small volume to an expanded state having a larger volume. The elastomeric expansion member is loaded in the mold cavity in its unexpanded state, that is in the state wherein it has an initial smaller volume. Together the elastomeric expansion member in its unexpanded state and reinforcing fibers would have a total volume that is less than the volume of the mold cavity. The difference between the combined volumes of the reinforcing fiber and the unexpanded expansion member compared to the volume of the cavity can be considered a void volume. The presence of this void volume assists in permeating resin throughout the reinforcing fibers.

The reinforcing fibers can be present in the cavity in an amount greater than 60% by weight of the total weight of the composite part and even in greater amounts, as for instance from about 75 to about 80% by weight of the weight of the composite part.

A plurality of identical elastomeric expansion members can be utilized in conjunction with a single mold allowing for cycling of the expansion members. Thus, while one member is being heated to form a composite part in the mold, others of the plurality of elastomeric expansion members are external of the mold and are cooling from their expanded state to their unexpanded state in preparation for recycling through the mold.

The expansion member within the mold and the mold itself can be heated by a variety of means including heating the totality of the mold with an external heat source, embedding a heating means in the expansion member or embedding a heating means in the mold preferably adjacent a surface that is in contact with the expansion member.

The use of the elastomeric expansion member allows for forming complicated parts having undercuts and the like in simple molds. Insofar as the elastomeric expansion member can be peeled away or otherwise removed from a complicated part by flexing, complex multiple part molds ordinarily necessary to form undercuts or other complicated part areas can be eliminated.

In forming complicated parts, the expansion member is shaped to include various segments. The segments help define the shape of a complex part, as for instance an undercut or the like. When using such an expansion member having various segments, the mold cavity may be differentially sized for different areas of the part to accommodate different thicknesses (and thus different expanded volumes) of the expansion member. In areas where the expansion member is thicker, the mold cavity can be made larger. This allows for extra expansion of a thicker area of the expansion member into a larger cavity area prior to initiation of the transfer of consolidation pressure from the expansion member to the composite part precursor resin and re-inforcement fibers. By utilizing such differential expansion, all areas of the component part can be subjected to similar consolidation pressure.

The objects of the invention are further achieved in a mold system for forming composite parts that includes a mold having a mold cavity therein. The cavity has a fixed volume with a part surface located in the cavity. The part surface is of a shape defining the shape of a composite part to be formed in the mold system. An expansion member capable of thermal expansion such that when heated it expands from an unexpanded state having a smaller volume to an expanded state having a larger volume is sized to be positionable in the cavity. When the expansion member is positioned in the cavity in its initial unexpanded state, the combined volumes of the expanded member and the composite parts that will be defined by the part surface is smaller than the volume of the cavity and when in the expanded state, the combined volume of the expansion member and the composite part are equal to the volume of the cavity. Further, a resin injection means for injecting resin into the cavity is associated with the mold. The resin injection means supplies resin to the cavity for consolidation with the fiber for forming a composite part.

BRIEF DESCRIPTION OF THE FIGURES

This invention will be better understood when taken in conjunction with the figures in which.

DETAILED DESCRIPTION OF THE INVENTION

In a typical prior art resin transfer molding process a two sided (typically male-female) mold is utilized. A control gap is formed between the faces of the mold pieces. A fiber preform is loaded within the control gap, the mold is closed and resin is then injected into the control gap. The resin permeates the fibers of the fiber preform. The resin is then cured. Upon completion of curing, the mold is disassembled and the part removed.

Resin transfer molding is useful for forming component parts from glass fibers, carbon fibers, aramid fibers or even other more exotic fibers such as boron fibers. Typically resins such as epoxies or bismaleimides are utilized for the resin component of the composite part. For many composites, heat is utilized to effect curing of the resin into the component part. Such heat curing typically requires the use of metal molds. Since currently practiced prior art resin transfer molding uses two sided molds, one of the drawbacks of the presently utilized resin transfer molding techniques is the cost of tooling the two sided molds.

In prior art resin transfer molding, if the component part that is to be formed has undercuts or other complicated or convoluted surfaces, multiple element molds are necessary in order to allow for extensive disassembling of the mold to remove the composite part after it is cured. Since each component of a multi-element mold must exactly mate with the other components, the expense of tooling such multi-element molds increases significantly. For certain industries, as for instance the automotive industry, where the tooling costs can be amortized over very large production runs, i.e. a large number of components formed in each tool, such expensive tooling may be justified, however, in limited production environments, high tooling costs can inevitably lead to higher prices per each component part formed with such tooling.

In the present invention, simplification of molds is achieved and thus a reduction in tooling costs is inherent therein. For molds utilized in the invention, only a single part surface need be tooled. The additional part surfaces are formed by an elastomeric expansion member that is loaded into the mold in a cold unexpanded state. The reinforcing fibers of the composite are located in the mold with the unexpanded expansion member and the mold closed. Resin is then injected into the mold to infiltrate and permeate the reinforcing fibers. The mold is then heated or at least the expansion member is heated to expand the expansion member to a larger volume. In expanding to a larger volume the expansion member consolidates the reinforcing fibers and resin against the part definition surface of the mold to define the composite part being formed in the mold.

In prior art resin transfer molding the gap between the two mold faces is the same size as the finished part. This limits the amount of reinforcing fibers that can be loaded into these molds. As an upper limit approximately 50 to 60% by weight of the fibers can be loaded in the mold.

In contrast, in the mold system of the present invention the reinforcing fibers and the expansion member are initially loaded into the mold cavity when the expanded member is in an unexpanded state. In this state it occupies less volume than it will when heated. The final volume of the composite part will be equal to the volume of the mold cavity minus the volume of the heated expanded expansion member. Prior to heating, with the expansion member in a smaller unexpanded state and with a load of reinforcing fibers located in the mold cavity, some of the cavity volume is still not occupied by either the unexpanded expansion member or the reinforcing fibers. This unoccupied volume can be considered as a void volume. The existence of this void volume facilitates loading the reinforcing fibers in the mold cavity since there is a little extra room within the mold cavity for fiber preform manipulation.

Additionally however, compared to when the expansion member is in an expanded state, when the expansion member is in its unexpanded state the void volume present within the mold cavity allows for loading of even higher amounts of reinforcing fibers into the mold prior to resin injection therein. Typically, higher fiber loads much greater than 60% can be achieved, as for instance at least up to and including from about 75% to about 80% fiber loading. As such the component part formed therein has a very high reinforcing fiber to resin ratio. This is very important in certain applications, as for instance in aerospace applications, wherein high structural strength of the composite parts is desired. The higher the loading of the reinforcing fiber in the composite part the greater the structural strength of the finished composite part. Thus, use of an expansion member as per the mold system and process of the invention allows for formation of composite parts having higher structural strength compared to other molding techniques.

Also, because the reinforcing fibers are loaded into the mold when the expansion member is in an unexpanded state, the fibers are not compressed when the mold is closed. In prior art resin transfer molding, compression of a fiber preform in closing the mold sometimes occurred. If fiber compression occurs, this unduly increases the packing density of the fibers resulting in increased resistance to permeation of the fiber preform by the resin. Undue compression of the fibers in the fiber preform can impeded or complicate distribution of the resin throughout the reinforcing fibers. This is eliminated in the mold system and process of the present invention because of the above referred to void volume present in the mold during both fiber loading and resin injection. Because there is additional empty space within the mold prior to injection of resin, the reinforcing fibers are not compressed and transfer of resin for complete saturation of the reinforcing fibers by the resin is facilitated.

An even further advantage of the mold system and process of the invention is achieved when the expansion member expands. A high resin load can be injected into the mold cavity when the expansion member is in an unexpanded and thus smaller state. Upon heating of the expansion member, it expands filling up the void volume in the cavity of the mold. This consolidates the resin and the reinforcing fiber together. Excess resin above that desired to achieve the desired resin reinforcing fiber ratio is eliminated from the mold by the expansion of the expansion member. This also contributes to achieving a higher ratio of the reinforcing fiber in the composite laminate part.

Figure 1:
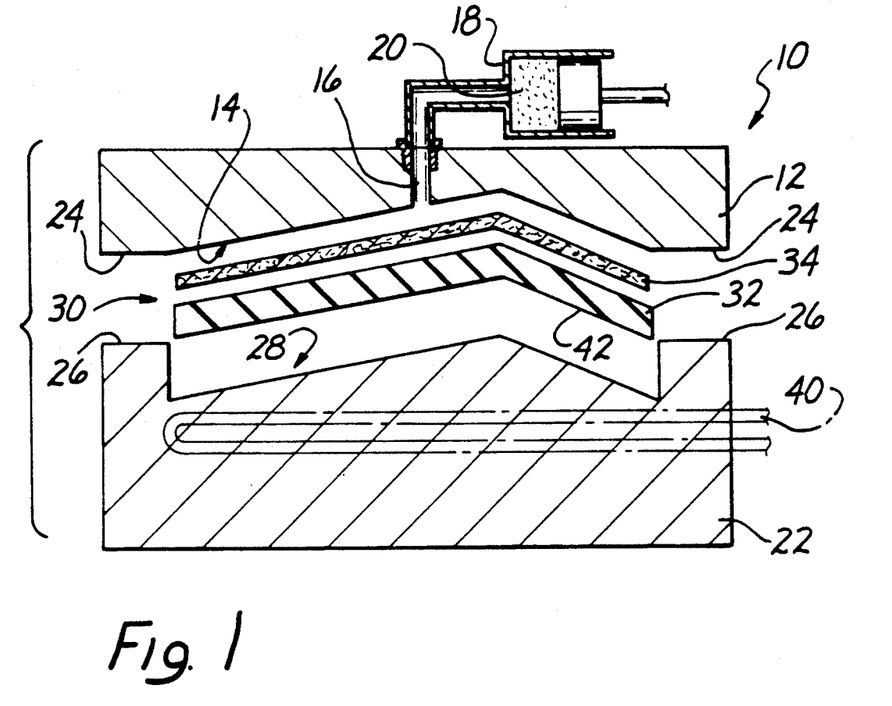
FIG. 1 is a side elevational view in section of a mold, an expansion member, reinforcing fibers and a resin injection system in solid line and a heating coil in phantom line for forming composite laminate parts utilizing the method and apparatus of the invention.
Figure 2:
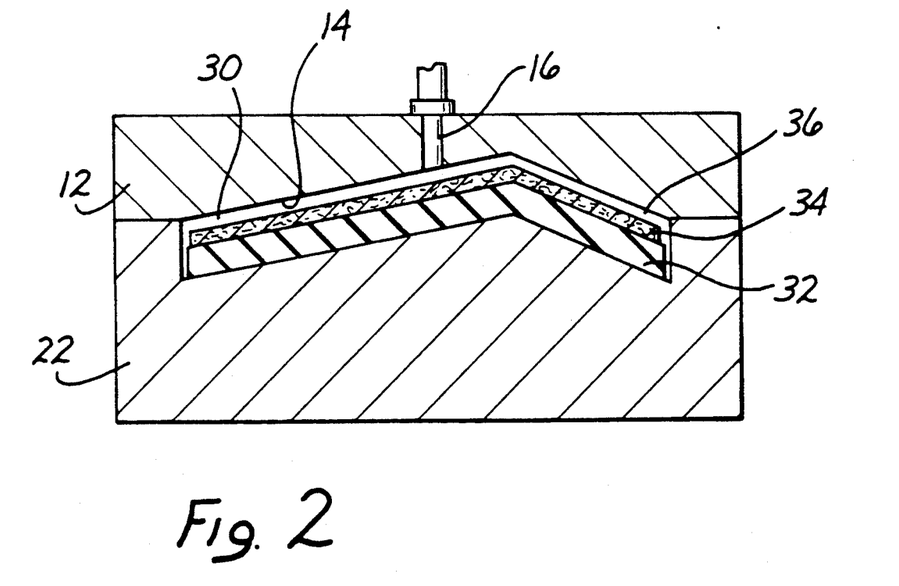
FIG. 2 is a side elevational view in section of certain component parts of the system of FIG. 1 showing those component parts in a closed configuration prior to heating.
Figure 3:
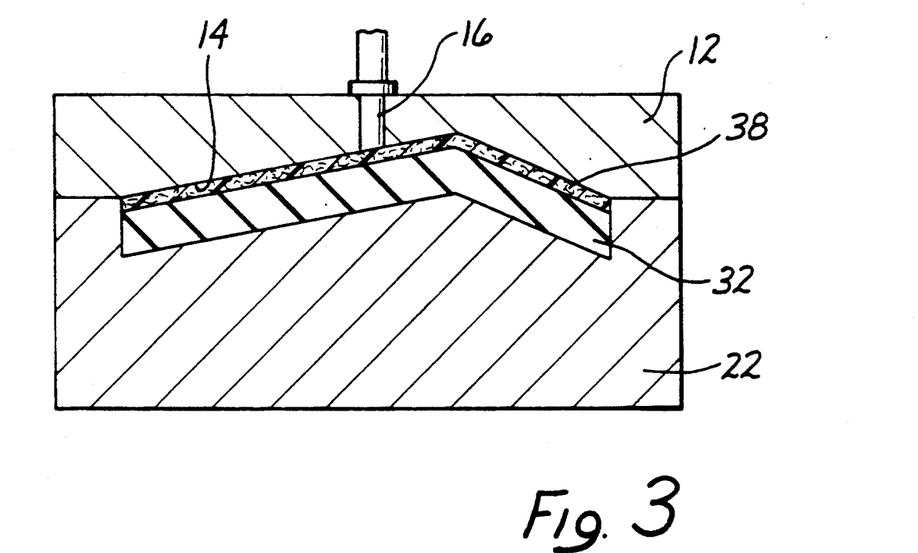
FIG. 3 is a figure similar to FIG. 2 showing the system after heating and expansion of the expansion member.

Referring now to FIGS. 1, 2 and 3, a mold system 10 for forming a composite laminate part is illustrated. The mold system 10 includes a first mold element 12 having a part definition surface 14 located thereon. A passageway 16 is formed in the mold element 12 and connects to a resin injector 18. The resin injector 18 can be any one of several known systems for injecting resin into the passageway 16. For illustrative purposes in FIG. 1 the resin injector 18 is depicted as a cylinder and injection piston that is capable of forcing uncured resin 20 through the passageway 16. It is, of course, realized that other resin injecting systems could be used, as for instance pumps, plural component injectors and other various injectors known in the resin transfer molding art.

A further mold element 22 is adapted to mate with the mold element 12. The mold element 12 has a joining surface 24 that mates against a joining surface 26 on the mold element 22. As is indicated in FIG. 2, the mold element 12 mates or abuts against the mold element 26 by butting the surface 24 against the surface 26. Not shown in the figures would be standard fasteners such as clamps, press platens and the like that would be used to maintain the elements 12 and 26 in an abutting relationship during resin injection and cure.

The mold element 22 has a recessed area 28 formed therein. Together the recessed area 28 and the part definition surface 14 form a mold cavity 30 between the two mold elements 12 and 22. The cavity 30 is sized to accept an elastomeric expansion member 32 and a reinforcing fiber preform 34. Prior to resin injection, the expansion member 32 and the preform 34 are loaded into the cavity 30 as is best seen in FIG. 2 wherein the mold element 12 has been closed onto the mold element 22.

The elastomeric expansion member 32 is formed of a suitable elastomeric substance that is capable of expanding when heated. Typical for use for the elastomeric expansion member 32 would be a silicone rubber. Reference is made to the above identified Kemp patent, U.S. Pat. No. 4,812,115 for formulation of silicone rubbers that would be suitable for the elastomeric member 32. Other useful silicone rubbers are commercially available from Dow Corning, Midland, Mich. Presently preferred is Dow Corning Silastic E silicone rubber.

Depending on certain variables such as size, temperature and the like, a typical elastomeric expansion member for use in the invention is selected to expand by about at least 5% when heated. As such the elastomeric expansion member 32 will have a sufficiently positive coefficient of thermal expansion whereby it substantially expands when heated from an initial unexpanded state having a smaller volume to an expanded state having a larger volume.

In FIG. 2 the elastomeric expansion member 32 is shown prior to heating in its unexpanded state. As is evident from FIG. 2, the combined volumes of the elastomeric member 32 and the reinforcing fiber preform 34 are less than the volume of the cavity 30. This creates a void volume 36 within the cavity 30. It is evident that because of the presence of the void volume 36 it is easy to close the two mold elements 12 and 22 upon one another since the fiber preform 34 does not have to be compressed to do so.

Once the elastomeric expansion member 32 and the reinforcing fiber preform 34 are located within the cavity 30 and the mold elements 12 and 22 temporarily joined to one another to close the cavity, resin can then be injected via the resin injector 18 into the cavity 30. Injection of the resin saturates and permeates the reinforcing fiber preform 34 and essentially fills the void volume 36.

The elastomeric expansion member 32 is now heated to expand the same. Heating can be accomplished via various expedients discussed below. Upon heating, the elastomeric member 32 expands. This consolidates the resin saturated reinforcing fiber preform 34 between the elastomeric member 32 and the part definition surface 14 as is seen in FIG. 3. The resin is then sufficiently cured while the elastomeric expansion member 32 is maintained in its expanded state. Upon curing, the resin 20 and the fiber preform 34 are joined together to form a composite laminated part identified by numeral 38 in FIG. 3.

Curing of the resin 20 depends upon the type of resin utilized. The resin might be a catalyst cured resin, a heat cured resin, or a combination of these. Suitable resins can include epoxy and bismaleimide resins or hybrids of the same as are used in prior art resin transfer molding techniques. After sufficient cure of the resin such that the composite part 38 is stable, the mold elements 12 and 22 can be separated for withdrawing of the composite part 38. Further, by allowing the elastomeric member 32 to cool, it contracts back to an unexpanded state.

The elastomeric member 32 can be heated in various ways. In FIG. 1, a heating tube 40 shown in phantom line, might be utilized (for illustration purposes, the same heating tube 40 is also shown in solid line in FIG. 4). Steam, hot oil or other hot liquid can be circulated through the coil 40 to heat the mold element 22. This in turn would transfer heat to the elastomeric expansion member 30 to heat the same.

The heating tube 40 is located within the mold element 22 in conjunction with a surface 42 of the expansion member 32 that is away from or distal from the part definition surface 14. This allows for heating of the expansion member 32 without heating of the resin, as for instance if a low temperature cure or room temperature cure resin was being used.

Also, for the embodiments of FIGS. 1, 2 and 3, the totality of the mold system 10 shown in these figures could be placed between platens (not separately illustrated or identified) in a press and the platens heated. The platens could be heated by steam or oil circulating through coils suitably located in the platens or by other similar means.

Alternately the elastomeric member 32 of FIGS. 1, 2 and 3 can be heated by disconnecting the resin injector 18 and heating the totality of the remaining components as seen in FIG. 3 in an autoclave or oven or the like. Thus, if a heat curing resin was used, the totality of the components in FIG. 3 could be placed in an autoclave or oven and heated. This would first heat up the elastomeric member 32 to expand it to the form seen in FIG. 3 followed by heat cure of the resin to form the component part 38.

Figure 6:
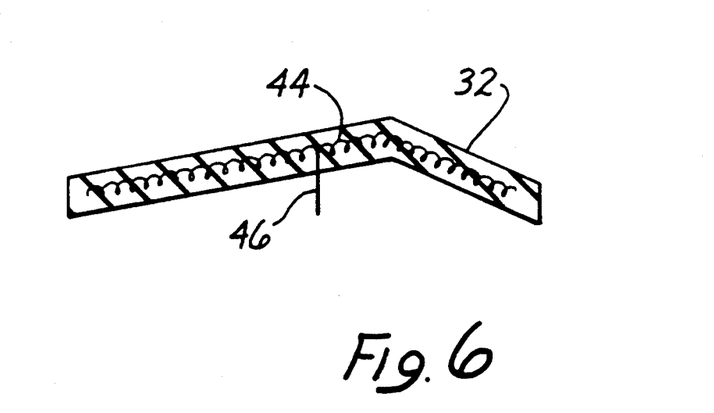
FIG. 6 is a side elevational view in section of the expansion member of the mold system of FIG. 1 showing a heating coil located directly in the expansion member

Further as is shown in FIG. 6, the elastomeric expansion member 32 could be directly heated. As illustrated in this figure, the member 32 has an electrical heating coil 44 embedded therein. Wire leads 46 connect to the coil 44. The leads 46 can be connected to a suitable source of current for heating the coil 44 to heat and expand the elastomeric member 32. For rapid expansion when utilizing fast setting room temperature curing resins, the direct heating method as depicted in FIG. 6 is particularly useful in that it allows for rapid expansion of the expansion member and, since the expansion member is somewhat of an insulator, only slow transfer of heat to the resin. This allows for expansion of the expansion member prior to setting of such a room temperature o low temperature curing resins.

During heating of the expansion member 32 of FIGS. 1, 2 and 3, any excess resin utilized in the mold systems 10 is ejected back out of the passageway 16 allowing for precise tailoring of the amount of resin to be incorporated or impregnated into the reinforcing fibers. After injection into the cavity 30 but prior to curing, since any excess resin has an exit channel via the passageway 16, the amount of resin incorporated into the fibers can be adjusted by appropriately sizing the expansion member in conjunction with the final temperature to which the expansion member is heated. This is determined by subtracting the volume of the expanded expansion member at the elevated working temperature from the volume of the cavity 30. What remains is the volume of the finished composite part 38.

To form the expansion member 30 of FIGS. 1, 2 and 3, the part surface 14 is formed on the mold element 12. It is then "waxed up" (a wax surface is built up thereon) to form a wax model of the desired part. In forming the wax model, wax is added to the part surface 14 until the correct thickness of the part is achieved. Further in forming the wax model, the wax assumes or mimics the contours of the part surface 14. The expansion member 32 is then cast on the wax model of the composite part. Since the expansion member 32 is cast directly onto the wax model of composite part, it assumes the correct part configuration for the side of the part not directly defined by the part surface 14. This eliminates the need for "hard" tooling of the mold component for that side of the composite part.

Figure 4:
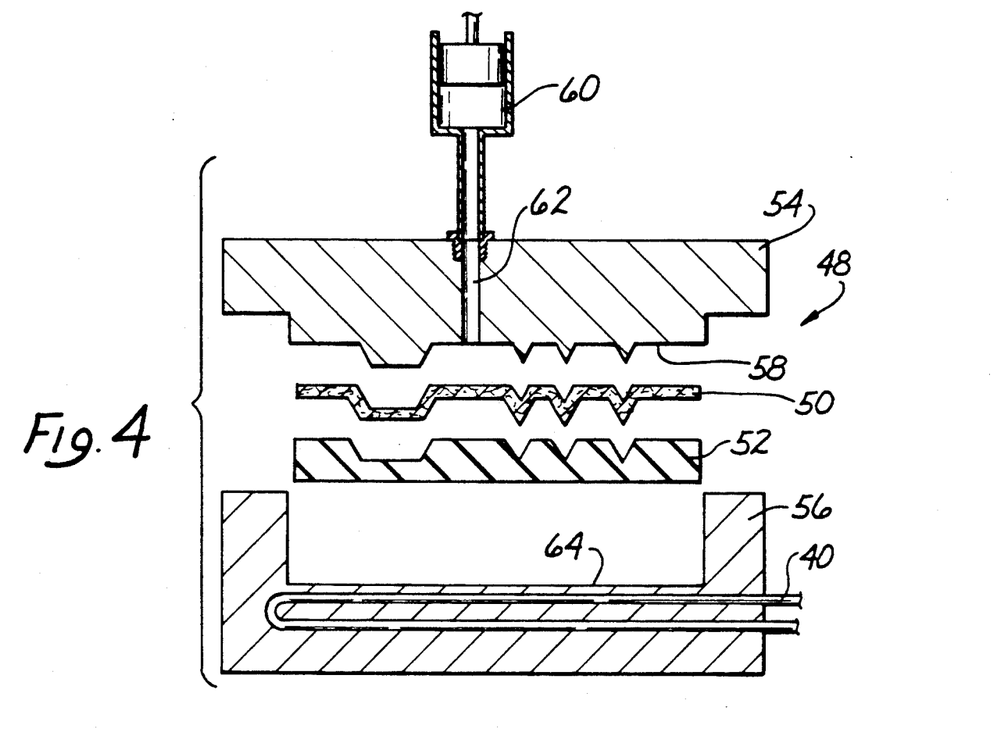
FIG. 4 is a side elevational view in section of a further mold, expansion member and reinforcing fiber preform of a mold system of the invention.

Referring now to FIG. 4, a mold system 48 for a more complicated composite part is illustrated. Used in forming this complicated part are a fiber preform 50 and an expansion member 52. They are loaded into a cavity in the mold of the mold system 48. The cavity is formed between mold elements 54 and 56. The mold element 54 includes a part surface 58 thereon. A resin injector 60 is associated with the mold element 54 to inject resin via a passageway 62.

The expansion member 52 is cast over a waxed model (that was formed as described above) that mimics the composite part that will be made utilizing the mold elements 54 and 56. As such the top surface of the expansion member 52 mimics the underneath surface of the component part that will be formed, that is the surface opposite the part definition surface 58.

Mold element 56 includes a cavity surface 64. The surface 64 does not have to have a complimentary shape to that of the part definition surface 58. Instead the surface 64 is flat. The surface 64 can be made of any shape that is easily and inexpensively tooled, as for instance, the flat or planar shape illustrated in FIG. 4.

In casting the expansion member 52, its bottom surface matches that of surface 64. Thus it is also flat and fits flush against the flat surface 64. The top surface of the expansion member mimics that of a wax model and thus is complimentary to the part definition surface 58. It defines the complicated shape of the composite part that will be formed. Since the top surface the expansion member 52 is formed simply by casting over a wax model, to form a complex composite part, only one "hard tooled" surface, surface 56, needs to be machined or tooled.

Figure 5:
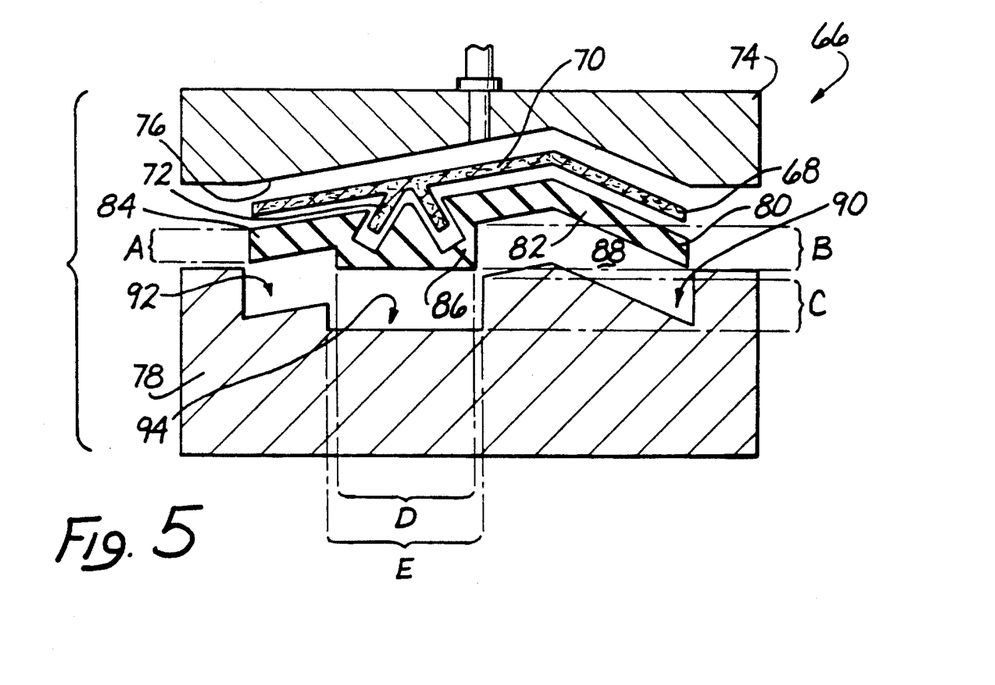
FIG. 5 is a side elevational view in section of an additional mold system of the invention utilized to form a complex part having an undercut thereon.

Referring now to FIG. 5, a mold system 66 for a further complex part is illustrated. The complex part will have the same shaped as its reinforcing fiber preform, fiber preform 68. The preform (and the composite part that will be formed from it) not only has a somewhat flat or planar area 70, but it further includes a V shaped rib 72 on its back surface.

It is evident from inspection of FIG. 5 that the rib 72 is a negative draft area, i.e. an undercut, that could only be removed from a conventional metal mold by constructing such a conventional metal mold as a very complicated multiple segmented mold. Such a mold would have to have at least three sections just to form the rib 72. One of these sections would be used to form the area within the V shaped between the sides of the rib. The other sections would have to fit inwardly from the sides, one from the left hand side and one from the right hand side, to be mated with the center section. This coupled with a top piece necessary to form the planar area 70 would comprise a very complicated mold that would be very expensive to tool. However with the present invention, such a complicated mold is not needed.

In FIG. 5 a first mold element 74 has a part definition surface 76 thereon. A second mold element 78 is designed to mate or abut against the mold element 74 as previously described for the mold system 10 of FIGS. 1 through 3. For the mold system 66, the rib 72 is defined by an elastomeric expansion member 80. While the expansion member 80 is a one piece integrally formed entity, for the sake of discussing its structure and in defining it in the claims appended to this specification, the member 80 can be considered as having several segments. These would include segment 82 and segment 84 that essentially define the planar areas 70 of a part and segment 86 that is utilized to define the rib 72.

While it is but a single cavity, in a like manner to that used in describing the expansion member 80, a recess 88 in mold element 78 can be considered as having a number of sections. These would include section 90 for receiving segment 82 of the expansion member 80, section 92 for receiving segment 84 of the expansion member 80 and section 94 for receiving segment 86 of the expansion member 80.

To form the expansion member 80, as before, a wax model is constructed against the part definition surface 76. Wax plates are then added to the model to form the rib 72. The expansion member 80 is then cast on this wax model. Then, since the elastomeric member 80 is very flexible, once it is removed from the recess 88 it can be removed from either the wax model or a finished component part mimicked by the wax model. This is done by simply flexing the expansion member 80 and lifting it off the back of the rib area 72 to free the rib area 72 from the expansion member 80. The recess 88, including its sections 90, 92 and 94, are machined to be much simpler than what would be necessary to form a complex structure corresponding to the rib 72. The recess 88 can be formed in a single mold component as opposed to having to use multiple mold components as would be necessary if a conventional metal mold was used in place of the expansion member 80.

In the same manner as described for mold system 10 of FIGS. 1 through 3, the expansion member 80 and the preform 68 are loaded into the mold elements 74 and 78 of mold system 66. The mold is then closed and resin is injected into the mold. Heat is then applied to the expansion member 80 to expand it. Expansion of the member 80 consolidates the resin and reinforcing fibers together to form a composite part. The mold is then opened. The expansion member 80 and the composite part are retracted from the recess 88. Once free from the mold, the expansion member 80 is simply folded or peeled back off of the complex composite part including the undercuts formed where the rib 72 joins the planar portion 70.

In order to allow for the differential thickness in the various areas of the expansion member 80, the section 94 of the recess 88 is oversized with respect to the segment 86 of the expansion member 80. Most of the expansion member 80 would have a thickness as defined by the bracket A seen on the left hand side of FIG. 5. The thickness of the segment 86 as shown by the bracket B is greater than the thickness of the remainder of the expansion member 80 shown by the bracket A. Because of this, about segment 86, the expansion member 80 is capable of a greater amount of expansion. To accommodate this greater expansion of the segment 86 with respect to the expansion of the segments 82 or 84, the section 94 of the recess 88 about the bracket C is oversized with respect to the depth of the remainder of the recess. Also, horizontal expansion is accommodated by over sizing the width of the section 94 about bracket E greater than the width of the segment 86 about bracket D.

It is thus evident that one of the sections of the mold cavity is of a greater dimension than a further of the sections allowing for differential expansion of the various segments of the expansion member. Stated in other terms, the expansion member is sized such that the ratio of the dimension of a first section of the mold cavity to the thickness of a first segment of the expansion member is greater than the ratio of the dimensions of a further of the sections of the mold cavity to the thickness of a further of the segments of the expansion member.

In each of the mold systems disclosed above, when the expansion members are in a cooled or unexpanded or contracted state, the totality of the volume of the expansion member plus the volume of the reinforcing fibers is less than the volume of the cavity allowing for easy injection of resin into the cavity to permeate the fibers. The final volume of the composite laminate is determined by the expanded volume of the expansion member after it is heated.

A mold of the invention for making a composite part can be selected as a multiple element mold having several (at least two) component parts. However, as is seen in FIG. 5, overly complicated molds are not necessary because complex and undercut areas of a composite part can be formed utilizing the expansion member as the defining surface. This is opposed to using complex expensive machined surfaces on metal to define such complex areas of the part.

Further, the molds can be formed, as for instance the mold of FIG. 4, such that in a multiple element mold there is a part definition surface on one component surface with a recess formed in the remainder of the component parts. The mold is selected such that the geometry of the recess is a simple geometric surface, as for instances a planar surface, that is essentially located opposite of the part definition surface. Such a simple geometric surface is easily and inexpensively tooled. It is, of course, recognized that even in the complex mold element 78 only simple planar surface are needed. The second mold element need not include a complicated part defining surface, but can include only simple planar surfaces. Thus, only a single part defining surface is necessary in utilizing the mold system of the invention.

The fiber preform utilized in the present invention can be loaded into the molds in any one of various forms. It can be selected as a non-woven fiber mat; a woven fiber mat or fabric; knitted fibers; stitched fibers; braided fibers; a single layer of fibers whether they be a woven mat or a fabric, a non-woven mat, knitted fibers, stitched fibers or braided fibers; multiples layers (the same or different) of fibers whether they be woven mats or fabrics, non-woven mats, knitted fabrics, stitched fibers, braided fibers; or even fibers adhered together with a sizing agent. Such a sizing agent would be included simply to adhere the preform fibers together and not to supply the resin component of the composite part.

Utilizing the mold systems of the invention, a process of the invention can be practiced by selected an appropriate mold having a mold cavity with a resin passageway and a part definition surface formed within the cavity for defining the shape of the composite part to be formed. An expansion member is loaded into the cavity followed by loading of a fiber preform. The mold cavity is closed and the resin is injected into the closed cavity through the resin passageway to saturate the fibers of the preform. The expansion member is then heated either directly or indirectly, to consolidate the resin and the reinforcing fibers between the expansion member and the part definition surface to shape the fibers and the resin into a component part mimicking the shape of the part definition surface and, if excess resin is located within the cavity, to expel that excess resin back through the passageway. The resin is then cured in the mold for a time sufficient for the consolidated fibers and resin to set at least to the point where they maintain the shape of the part definition surface. Curing to the final cure state of the component part can be done within the mold or once the green part has at least set sufficiently to hold the shape of the part definition surface, it can be removed and given a post cure to achieve the final properties of the composite laminate part.

For high production cycles, since the most expensive component of the mold system would be that part of the mold having the part definition surface thereon, multiple expansion members can be formed and used with a single mold element having the part definition surface thereon. While one of the expansion members is being heated within the mold to form a composite part, other expansion members are located external of the mold where they are cooled down from their expanded state to an unexpanded state ready for their next cycle within the mold.

Because, as opposed to standard resin transfer molding systems, a void area is available within the mold cavity prior to expansion of the expansion member, resin can be injected at lower pressure and still achieve proper saturation and permeation of the fiber preform. In the mold system of the invention it is not the injection pressure of the resin that finally achieves complete penetration of the resin into the fiber matrix, but it is the expansion of the expansion member. Because of this, low resin injection pressures can be used as for instance from about 30 to about 100 psi.

This invention has been described in its presently contemplated best mode, and it is clear that it is susceptible to numerous modifications, modes and embodiments within the ability of those skilled in the art and without the exercise of inventive faculty. Accordingly, the scope of this invention is defined by the scope of the following claims.

We claim:

1. A resin transfer process for forming a composite part from dry reinforcing fibers and resin comprising:
   selecting a mold having a mold cavity, said mold having a resin passageway into said cavity, said cavity including a part definition surface for defining the shape of a composite part to be formed;
   selecting an expansion member made of a solid, thermally expandable elastomeric material capable of expanding to a larger volume in response to being heated;
   locating said expansion member in said mold cavity;
   locating reinforcing fibers in said mold cavity in association with said expansion member;
   closing said mold cavity;
   injecting resin into said closed mold cavity through said resin passageway to saturate said fibers;
   heating said expansion member to expand said expansion member an amount sufficient to consolidate said resin and said reinforcing fibers between said expansion member and said part definition surface to shape said fibers and said resin into a component part mimicking the shape of said part definition surface;
   curing said resin within said mold for a time sufficient for said consolidated fibers and resin to maintain the shape of said part definition surface; and
   cooling said mold, part, and said expansion member and removing said expansion member from said part and said part from said mold.

2. The method of claim 1 wherein said thermally expandable elastomeric member is silicone rubber.

3. The method of claim 1 including:
   selecting a plurality of identical elastomeric expansion members; and
   cycling said expansion members whereby when one of said plurality of elastomeric expansion members is located in said mold and is heated from said unexpanded state to said expanded state the remainder of said plurality of elastomeric expansion members are located external said mold; and
   cooling said remainder of said plurality of expansion members whereby they contract from said expanded state to said unexpanded state.

4. The method of claim 1 including:
   embedding a heating means for heating in said expansion member; and
   heating said expansion member with said heating means.

5. The method of claim 1 including:
   contacting a surface of said expansion member with a heating means for heating; and
   heating said expansion member with said heating means.

6. The method of claim 5 including:
   contacting said expansion member with said heating means at a surface distal from where said expansion member contacts said fibers and said resin during said consolidation of said resin and said reinforcing fibers against said part definition surface.

7. The method of claim 1 including:
   selecting said mold such that said mold cavity has at least two intersecting sections; and
   selecting said elastomeric expansion member such that it has a number of connected segments equal to the number of said intersecting sections of said mold cavity with each of said segments sized to fit within one of said mold cavity sections.

8. The method of claim 7 including:
   selecting said elastomeric expansion member such that the thickness of said member about one of its said connected segments is greater than the thickness of said member about a further of said connected segments.

9. The method of claim 8 including:
   selecting said mold such that the dimension about a first of said section of said mold cavity is greater than the dimension about a further of said sections; and
   positioning said first of said connected segments of said expansion member within said first of said section of said mold cavity.

10. The method of claim 9 including:
    sizing said expansion member such that ratio of the dimension of said first section of said mold cavity to the thickness of said first segment of said expansion member is greater than the ratio of the dimension of a further of said section of said mold cavity to the thickness of a further of said segments of said expansion member.

11. The method of claim 1 including:
    sizing said expansion member with respect to said mold cavity and selecting an amount of said reinforcing fiber such that when said mold cavity is closed prior to the injection of said resin into said closed mold cavity the combined volume of said expansion member and the volume of said reinforcing fiber is smaller than the volume of said cavity.

12. The method of claim 1 including:
    selecting said mold as a multiple element mold having at least two component parts with said part definition surface formed on one of said component parts and with a recess formed on the remainder, and wherein said component parts abut together and when abutted together said part definition surface and said recess forming said mold cavity; and
    expelling any excess resin from said cavity through said passageway in response to expansion of said expansion member.

13. The method of claim 12 including:
    selecting said mold such that the geometry of said recess includes at least one planar surface, said planar surface positioned so as to oppose said part definition surface.

14. The method of claim 1 including:
    selecting said reinforcing fibers as a fiber preform.

15. The method of claim 14 wherein:
    said fiber preform is selected from the group consisting of non-woven fiber mats, woven fiber fabrics, knitted fibers, stitched fibers, braided fibers, single layers of fibers, multiple layers of fibers and fibers adhered together with a sizing agent.

16. The method of claim 1 including:
    locating an amount of said reinforcing fibers in said cavity greater than 60 percent by weight of the weight of composite part.

17. The method of claim 16 including:
    locating an amount of said reinforcing fibers in said cavity essentially equal to about 75 percent by weight of the weight of composite part.

18. A resin transfer molding process for forming a composite part from dry reinforcing fibers and resin comprising:

provi­ding a mold having a mold cavity, said mold having a resin passageway into said cavity, said cavity including a part definition surface for defining the shape of a composite part to be formed;

providing an expansion member made of solid elastomeric material capable of expanding to a larger volume in response to being heated;

providing a resin injector located in operative association with said passageway;

said passageway means serving to conduct resin from said resin injector to said cavity, locating said expansion member in said mold cavity;

locating reinforcing fibers in said mold cavity in association with said expansion member;

closing said mold cavity;

injecting resin into said closed mold cavity through said resin passageway to saturate said fibers;

heating said expansion member to expand said expansion member an amount sufficient to consolidate said resin and said reinforcing fibers between said expansion member and said part definition surface to shape said fibers and said resin into a component part mimicking the shape of said part definition surface;

curing said resin within said mold for a time sufficient for said consolidated fibers and resin to maintain the shape of said part definition surface; and cooling said mold, part, and said expansion member and removing said expansion member from said part and said part from said mold.

* * * * *